United States Patent [19]

Inakagata

[11] Patent Number: 4,755,735
[45] Date of Patent: Jul. 5, 1988

[54] CHARGE CONTROL CIRCUIT FOR A BATTERY CHARGER

[75] Inventor: Satoru Inakagata, Hikone, Japan

[73] Assignee: Matsushita Electric Works, Ltd., Osaka, Japan

[21] Appl. No.: 14,334

[22] Filed: Feb. 13, 1987

[30] Foreign Application Priority Data

Feb. 20, 1986 [JP] Japan .................................. 61-35623

[51] Int. Cl.$^4$ ............................................... H02J 7/04
[52] U.S. Cl. ....................................... 320/35; 320/20; 320/36
[58] Field of Search ....................... 320/35, 36, 20, 43, 320/44

[56] References Cited

U.S. PATENT DOCUMENTS

| | | | |
|---|---|---|---|
| 3,599,071 | 8/1971 | Lapuyade et al. | 320/35 |
| 3,852,652 | 12/1974 | Jasinski | 320/35 |
| 3,917,990 | 11/1975 | Sherman, Jr. | 320/35 |
| 4,622,509 | 11/1986 | Spruijt | 320/36 |

Primary Examiner—R. J. Hickey
Attorney, Agent, or Firm—Armstrong, Nikaido, Marmelstein & Kubovcik

[57] ABSTRACT

A charge control circuit for a battery charger has a sensor circuit for sensing the temperature of a battery being charged and providing an output indicative thereof. A differentiator circuit converts the output of the sensor circuit into an instantaneous time derivative of thereof which is indicative of a corresponding temperature gradient of the battery. When the time derivative is determined by a judging circuit to be below a predetermined threshold indicative of the battery reaching its full charge state, the judging circuit responds to provide a first control signal, causing the battery charger to charge the battery at a high rate. Once the time derivative exceeds the threshold, the judging circuit provides a second control signal, causing the charger to terminate the high rate charge and change to a trickle charge or zero rate charge.

5 Claims, 9 Drawing Sheets

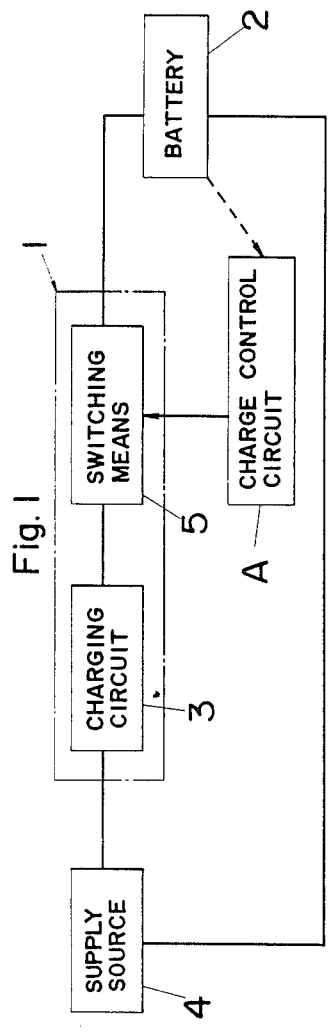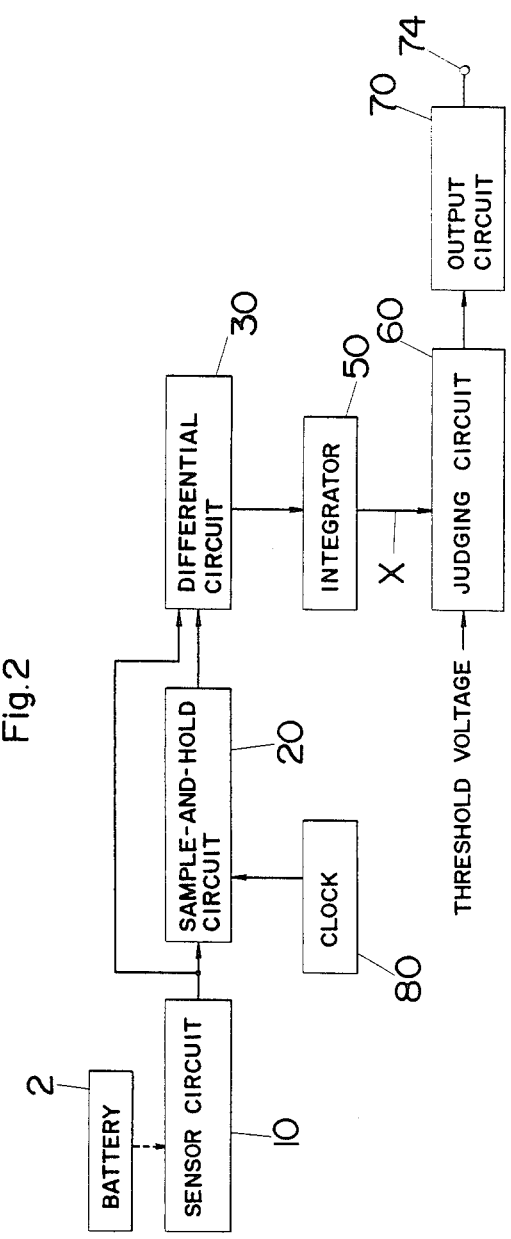

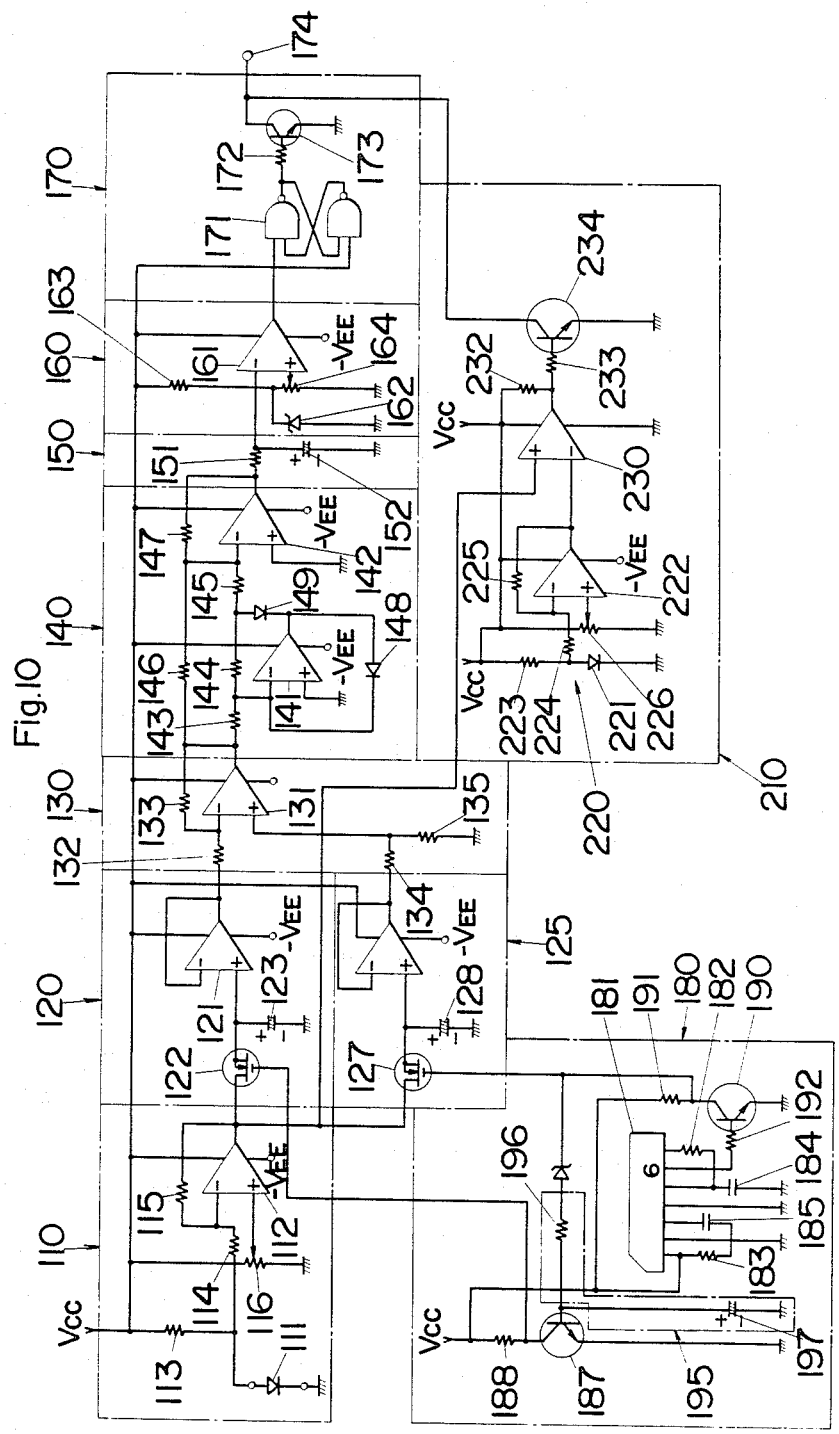

CHARGE CONTROL CIRCUIT FOR A BATTERY CHARGER

BACKGROUND OF THE INVENTION

1. Field of the Invention

The present invention is directed to a charge control circuit for a battery charger, and more particularly to a battery control circuit adapted for a battery charger to selectively providing first and second control signal for changing the rate of charge depending upon the temperature gradient of the battery being charged.

2. Description of the Prior Art

Battery chargers for storage batteries such as nickel-cadmium cells are required to be controlled by a suitable control circuit for achieving a rapid and safe charge. Basically, there have been proposed two control techniques to monitor the terminal characteristics of the battery for terminating the rapid charge before the battery is overcharged, one is to monitor the terminal voltage and the other is to monitor the battery temperature, both increasing as the battery is charged. It has also been found, as taught in U.S. Pat. No. 3,337,026, that the battery temperature is well indication of the charge state of the battery and therefore is a more consistent measure than the terminal voltage. Improvements in controlling the battery charger based upon the battery temperature measurement are proposed in U.S. Pat. Nos. 3,599,071 and 3,917,990 in which the ambient temperature is monitored together with the absolute battery temperature so as to provide a control signal as a function of the difference between the battery and ambient temperatures in an attempt to effectively charge the battery in a relatively hot or cold environment at which conditions the battery would be less- or over-charged with the control circuit only monitoring the absolute battery temperature since the initial temperature of the battery in that environment is correspondingly high or low and therefore requires less or greater time before reaching the absolute critical temperature to terminate the rapid charge.

These prior control circuits monitoring the difference between the battery and ambient temperatures, however, still have a problem that a fixed temperature difference determining the point at which the high rate charge is terminated may not always apply to different batteries which are always required not to be less- or over-charged. In other words, different settings as to the temperature difference may be required for different batteries in order to successfully charge the batteries to its full capacity, yet prevent overcharge. This is a rather complicated and inconvenient process for the charge control circuit to perform. Further, even if monitering the temperature difference works well for the different batteries there still remains a problem that the measurements of the ambient temperature may considerably fluctuate from spot to spot in actual use, thus making it difficult to determine an exact temperature difference applicable to varying environments and therefore possibly failing to provide a consistent index ensuring effective charge performance. These problems are inevitable insofar as the battery-to-ambient temperature difference is utilized as an index to terminate the high rate charge. Therefore, it is highly desirable to find an alternative parameter which is well indicative of the actual charge state of the battery without suffering from the above uncertainty for ensuring a consistent charge control over varying ambient temperature conditions.

SUMMARY OF THE INVENTION

The present invention eliminates the above problem with the finding that the battery temperature exhibits an abrupt rise when the battery comes to be fully charged. This characteristic temperature rise or greater temperature gradient holds true over a normal ambient temperature range and can be used as an optimum parameter well indicative of the actual charge state of the battery for providing a consistent charge control. A charge control circuit for a battery charger in accordance with the present invention utilizes this temperature gradient or the time derivative of the battery temperature in controlling the battery charger by selectively providing first and second control signal thereto, the first control signal actuating the battery charger to operate at a first or high charge rate while the second control signal actuates it to operate at a second charge rate which may be a trickle charge rate or zero charge rate. The control circuit comprises a sensing means for sensing the battery temperature being charged and providing an output indicative of the sensed battery temperature, and a differentiator means for converting the output of the sensing means into an instantaneous time derivative thereof which is indicative of a corresponding gradient of the battery temperature being sensed. The resulting time derivative is then compared at a judging circuit means with a predetermined threshold in order to provide the first control signal when the time derivative remains smaller than the threshold and provide the second control signal when the time derivative becomes greater than the threshold. Once the time derivative of the battery temperature goes beyond the threshold, or the battery temperature shows the abrupt rise indicative of the battery reaching the full charge state, the control circuit responds to issue the second control signal so as to change over from the high rate charge to the trickle or zero rate charge, preventing the battery from being overcharged.

Accordingly, it is a primary object of the present invention to provide a charge control circuit for a battery charger which utilizes the time derivative of the battery temperature as a parameter indicative of the charge state of the battery for consistently controlling the charge rate.

In one version of the present invention, a sample-and-hold circuit is included in the control circuit for periodically repeating to measure a value of the output level of the sensing means and to hold the last measured value. The last measured value which is constantly updated is fed together with an instant measured value from the sensor means to the differentor circuit means where they are processed to provide an instantaneous time derivative of the battery temperature.

It is therefore another object of the present invention to provide a charge control circuit for a battery charger in which the sample-and-hold circuit is combined with a differential amplifier to make the differentiator means providing the time derivative of the battery temperature or the temperature gradient of the battery being charged.

In another version of the present invention, a pair of sample-and-hold circuits are combined with a differential amplifier to define the differentiator means producing the time derivative of the battery temperature. The sample-and-hold circuits, each periodically repeating to measure a value of the output level of the sensing means and to hold the last measured value operate alternately with respect to time so that one circuit is in sampling operation while the other is in holding operation. The differential amplifier subtracts in each half of the repeating cycle the output of one of the sample-and-hold circuits from the output of the other circuit so as to obtain the difference between the instantaneous value being measured by the one circuit and the last measured value held by the other circuit for differentiating the output of the sensor means with respect to time, thus providing uninterruptedly an instantaneous time derivative of the battery temperature indicative of a corresponding gradient of the battery temperature being sensed. The resulting time derivative is fed to a judging circuit means where it is compared with a predetermined threshold for selectively providing the first and second control signals depending upon the comparison result. With this provision of utilizing a pair of sample-and-hold circuits of which outputs are subtracted from each other in each half of the repeating cycle, there is no interruption in the resulting time derivative such that the abrupt temperature rise indicative of the battery reaching its full charge state is never overlooked, enhancing the reliability in the detection of a critical point at which the first control signal should be changed to the second control signal for reliably protect the battery from being overcharged.

It is therefore a further object of the present invention to provide a charger control circuit which has an increased reliability in the detection of the full charge state of the battery and thus in the control of the battery charger.

Preferably, the control circuit includes a battery protection circuit means which has a predetermined reference level indicative of a dangerous battery temperature above which temperature the charging at the first charge rate will certainly damage the battery. The protection circuit means constantly compares the output level of the battery temperature sensor means with its reference level so that, when the output level of the sensor means exceeds the reference level, it produces an inhibition signal which disables the first control signal to be issued from the control circuit until the output level of the sensor means is decreased to the reference level. This allows the control circuit to inhibit the high rate charge for protection against overcharging so long as the battery remains at above the dangerous temperature and to automatically restart the high rate charge once the battery is cooled to a safe temperature, which is a still further object of the present invention.

An indicator lamp is cooperative with the battery protection circuit means to be lit up so long as the inhibition signal is issued therefrom for indicating that the battery is refrained from being charged at the high rate, whereby novice users can be easily confirmed of that fact and not be confused.

Alternatively, the control circuit may preferably have a temperature compensative battery protection circuit means which obtains the difference between the battery temperature and the ambient temperature so as to provide an inhibition signal when the difference is critically greater than a predetermined acceptable value. To this end, another sensing means is incorporated to sense the ambient temperature of the control circuit and provide an output indicative thereof. The output is fed together with the output indicative of the battery temperature to the protection circuit means, which responds to issue the inhibition signal when the difference is greater than the acceptable value. The inhibition signal disables the first control signal to be fed to the battery charger until the difference is reduced to within the acceptable value. With this arrangement, when the hot battery immediately after being discharged is intended to be charged while the temperature difference is such that the charging at the high rate will cause further temperature increase of the battery and therefore damage to the battery, the control circuit will be prevented from feeding the first or high rate charge control signal until the difference is reduced to such an acceptable extent that the battery can be charged at the high rate without being damaged by the high rate charge current.

It is therefore a still further object of the present invention to provide a charge control circuit which is capable of monitoring the difference between the battery and the ambient temperatures for achieving a safe charge operation.

In the control circuit utilizing a pair of sample-and-hold circuits for continuously obtaining the time derivative of the battery temperature, a reset circuit is preferred which responds to the initial energization of the sample-and-hold circuits for momentarily actuating them into simultaneous sampling operations prior to the circuits entering their normal alternate operations in order to cancel any offset values remaining held in the sample-and-hold circuits at the time of deenergization thereof, which offset values might be the cause of erroneous processing at the subsequent steps to produce a false signal indicative of the abrupt temperature increase although there is no actual abrupt temperature increase. With this reset circuit, the control circuit can be properly initialized to be ready for correct operation each time it is turned on.

It is therefore a further object of the present invention to provide a charge control circuit in which a reset circuit prevents the false operation of the sample-and-hold circuits and enhances the reliability of the charge control operation.

These and the still other objects and advantages will be apparent from the following description of the preferred embodiments when taken in conjunction with the attached drawings.

BRIEF DESCRIPTION OF THE DRAWINGS

FIG. 1 is a simplified block diagram of a battery charger system to which a charge control circuit of the present invention is adapted;

FIG. 2 is a block diagram of the charge control circuit in accordance with a first preferred embodiment of the present invention;

FIG. 10 is a circuit diagram of a charge control circuit in accordance with a third embodiment of the present invention.

DESCRIPTION OF THE PREFERRED EMBODIMENTS

Figure 3:
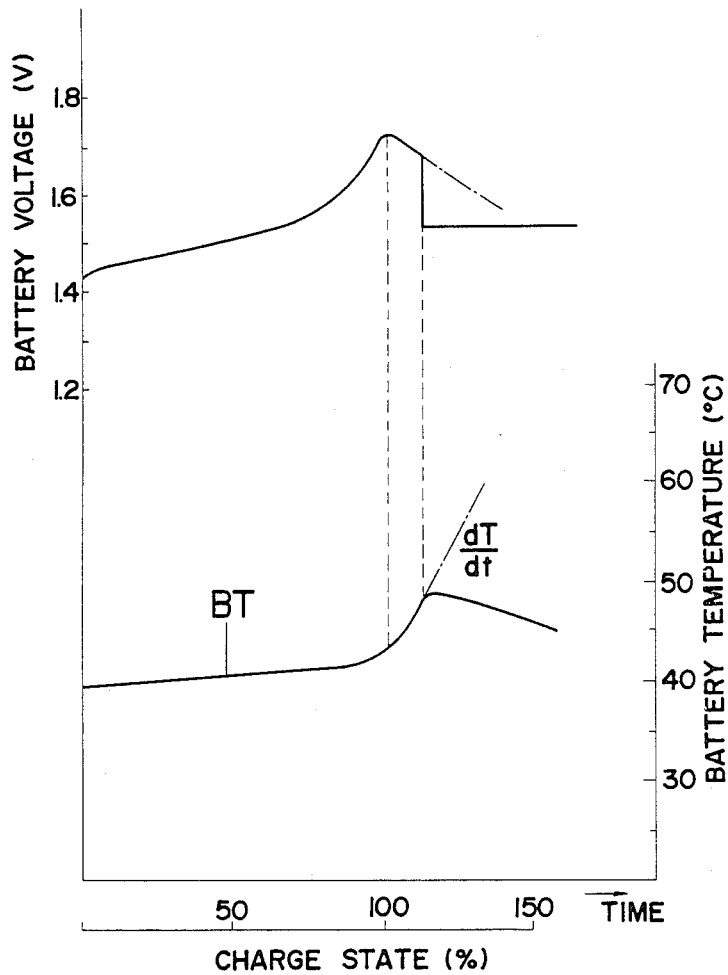
FIG. 3 is a graph illustrating a characteristic temperature rise of the battery observed during the charging process as well as the terminal voltage of the battery being charged.

As shown in FIG. 1, a charge control circuit A of the present invention is adapted in use to be connected to a battery charger 1 for controlling a charge current to be delivered to a battery 2 such as a nickel-cadmium battery to be charged. The battery charger 1 is of conventional configuration including a charging circuit 3 which is supplied by a supply source 4 to deliver the charge current to the battery 2 through a switching means 5. The switching means 5 may be a known solid-state switch such as a SCR or any other switch which is controlled by the output of the control circuit A to switch between a high charge rate and a trickle or zero charge rate for obtaining quick and safe charge. The present invention is based upon the finding that the battery temparature shows an abrupt rise in the vicinity of reaching a full charge state, in contrast to that it follows a rather flat curve while the battery is in an insufficient charge state, as shown in FIG. 3. This characteristic temperature rise or greater temperature gradient is found to be well indicative of the full charge state and provides a reasonable basis for changing the high rate charge to the trickle or zero rate charge.

First embodiment [FIGS. 2 to 5]

Referring now to FIG. 2, a control circuit A in accordance with a first embodiment is shown to be basically composed of a sensor circuit 10 for sensing the temperature of the battery 2, a sample-and-hold circuit 20, a differential circuit 30, and a judging circuit 60. The sample-and-hold circuit 20 repeats at a suitable sampling rate or clock frequency to measure the output level of the sensor circuit 10 and to hold the last measured value. The last measured value which is constantly updated by sample-and-hold circuit 20 is fed to differential circuit 30 where it is compared with an instantaneous output level of sensor circuit 10 so as to provide a signal indicative of a time derivative of the battery temperature being sensed, or the temperature gradient. The signal from differential circuit 30 is then fed to judging circuit 60 where its magnitude is compared with a predetermined threshold selected in order to provide a first control signal when the magnitude of the time derivative signal is below the threshold and a second control signal when the former exceeds the latter. The first control signal actuates switching means 5 for initiating the high rate charge while the second control signal attuates switching means 5 for changing to the trickle or zero rate charge from the high charge rate.

Figure 4:
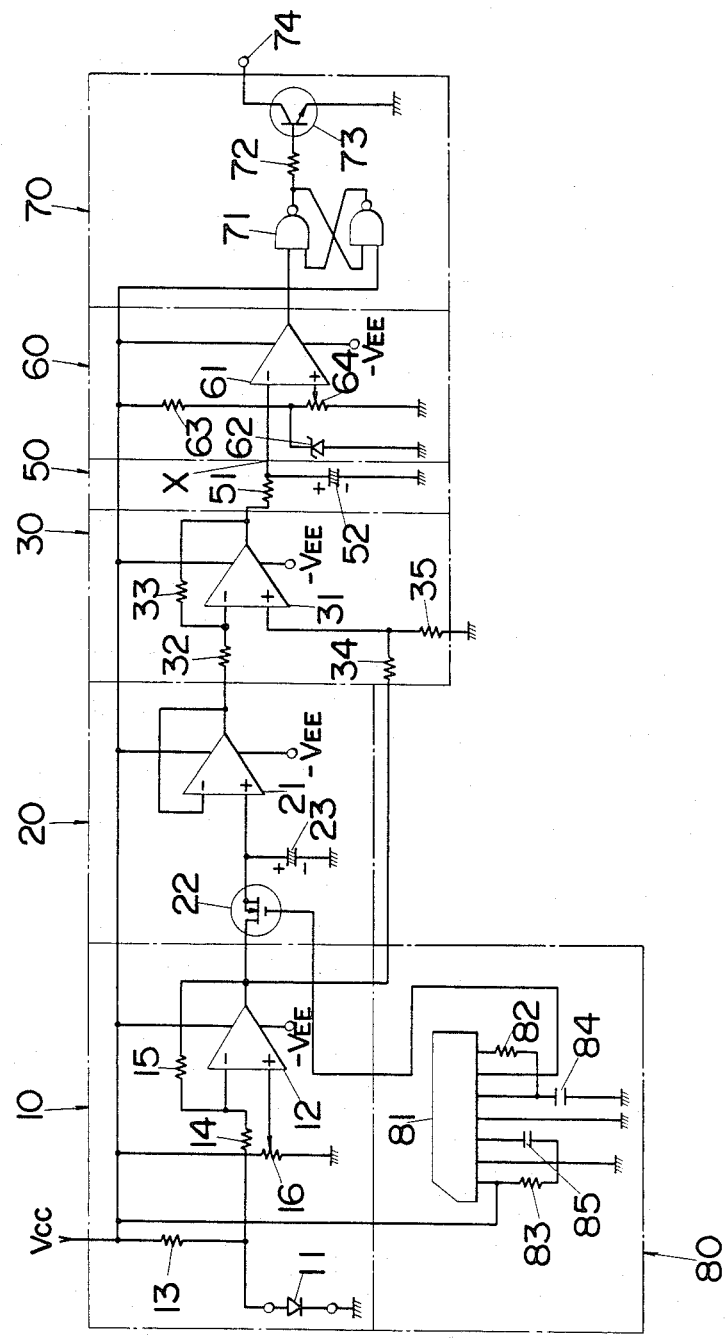
FIG. 4 is a detailed circuit diagram of the charge control circuit of FIG. 2.

FIG. 4 shows details of the control circuit A in which the sensor circuit 10 comprises a diode 11, operational amplifier 12, resistors 13 to 15, variable resistor 16 arranged in a conventional design for sensing the battery temperature and providing an output voltage indicative thereof. Diode 11 is placed in thermal proximity to battery 2 and provides an output voltage corresponding to the sensed temperature level. Sample-and-hold circuit 20, composed of an operational amplifier 21, transistor 22, and capacitor 23, is driven by the clock pulse fed to the gate electrode of transistor 22 from a clock 80 composed of a timer IC 81, external resistors 82 and 83, capacitors 84 and 85. Differential circuit 30 to which the output of sample-and-hold circuit 20 is fed comprises a differential amplifier 31, and resistors 32 to 35. Additionally, the control circuit A includes an integrator 50 which is composed of resistor 51 and capacitor 52 so as to convert the output of differential circuit 30 into an integrated electrical value with respect to time for effective comparison at judging circuit 60. Judging circuit 60 comprises a comparator 61 which has its inputs connected respectively to integrator 50 and a threshold voltage generator composed of zener diode 62, resistor 63, and variable resistor 64. Connected to judging circuit 60 is an output circuit 70 which comprises NAND latch 71, resistor 72, and output transistor 73 with an open-collector output terminal 74.

Figure 5:
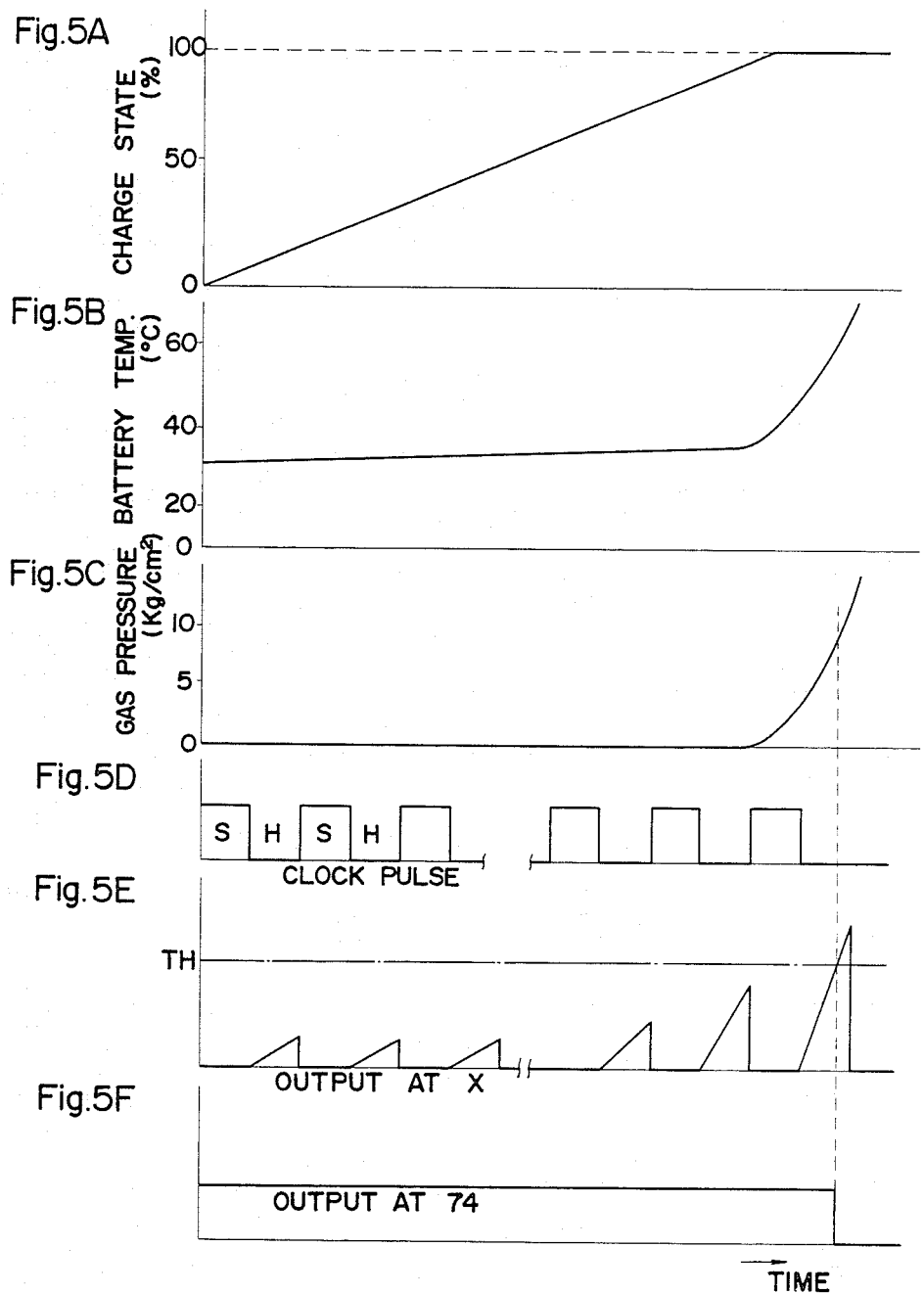
FIG. 5, composed of FIGS. 5A to 5F, is a time chart showing the waveforms of output signals at particular points in the control circuit together with terminal characteristics of the battery being charged.

Operation of the control circuit A will be now discussed with reference to FIG. 5 which is composed of FIGS. 5A to 5F respectively showing with respect to charging time, charge state [%] of battery (FIG. 5A), surface temperature [°C] of battery (FIG. 5B), internal gas pressure [Kg/cm$^2$] of battery (FIG. 5C), waveform of clock pulse fed to sample-and-hold circuit 20 (FIG. 5D), waveform of the output signal at point X in FIGS. 2 and 4 (FIG. 5E), and waveform of the output at output terminal 74 (FIG. 5F). Upon energization of the control circuit A, it provides at its output terminal 74 the first control signal for initiating the high rate charge. Until the battery 2 is charged at the high rate up to substantially 100% of its capacity, the battery temperature increases gradually on a rather flat portion of curve BT of FIGS. 3 and 5B. At this condition, the instantaneous output level of sensor circuit 10 is slightly higher than the output level of sample-and-hold circuit 20 so that the amplitude of the time derivative of the battery temperature obtained at the differential circuit 30 is small and therefore the integral thereof (see FIG. 5E) at the output X of the integrator 50 is kept at a low value relative to the predetermined threshold (indicated a dashed line TH in FIG. 5E), whereby comparator 61 of judging circuit 60 continues producing the first control signal or high level signal at output terminal 74, as shown in FIG. 5F, allowing the battery to be charged at the high rate. Once battery 2 goes beyond its fully charged state, the temperature gradient [dT/dt] is sharply increased, as shown in FIGS. 3 and 5B, so that there is produced at differential circuit 30 the time derivative of the battery temperature of greater value and therefore the correspondingly greater integrated electric value at integrator 50. Such greater value exceeds the threshold and causes the comparator 61 to produce the second control signal at output terminal 74 for changing to the trickle or zero rate charge from the high charge rate, preventing further high rate charge to protect the battery from being overcharged and damaged. Upon this occurrence, NAND latch 71 inhibits the first control signal from again appearing at output terminal, 74, eliminating the possibility that the battery 2 will be further charged at the high rate, although comparator 61 will normally act to do so due to the termination of the high rate charge and therefore the reduction in the gradient of the battery temperature.

Second embodiment [FIGS. 6 to 9]

Figure 6:
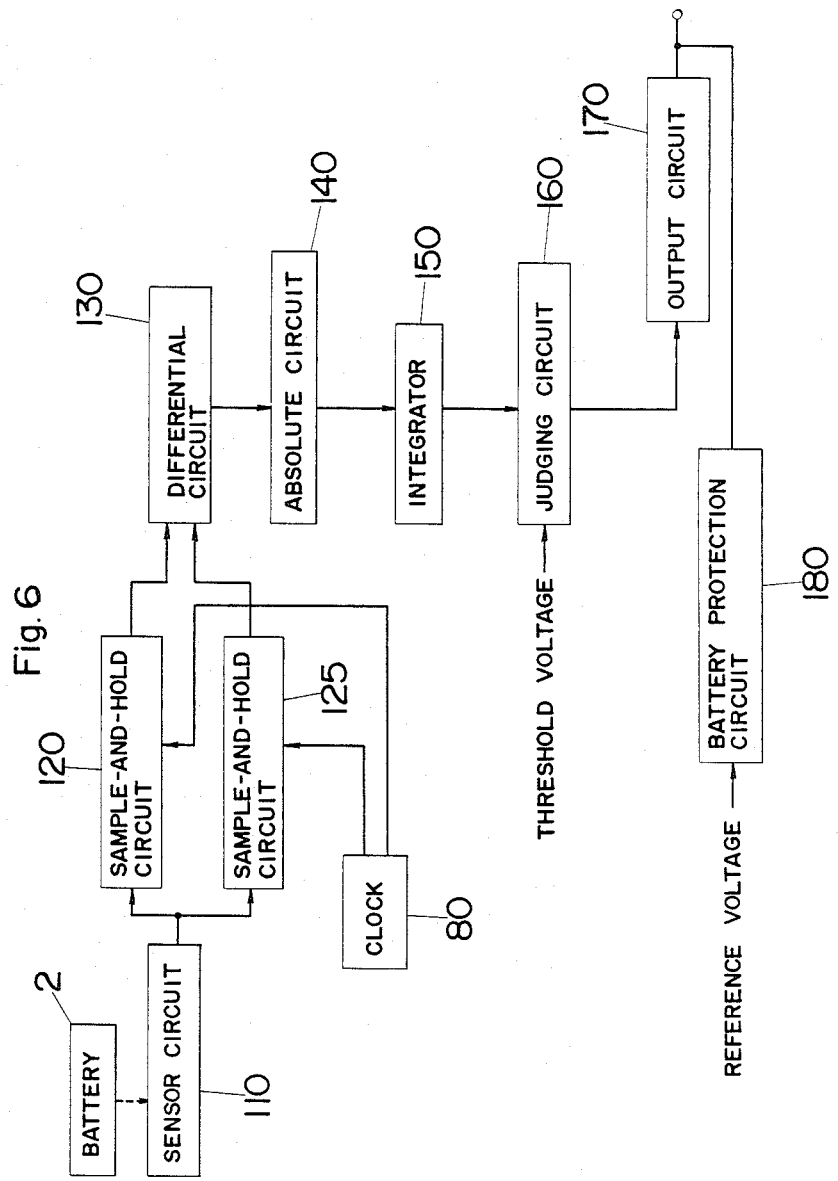
FIG. 6 is a block diagram of a charge control circuit in accordance with a second preferred embodiment of the present invention.
Figure 7:
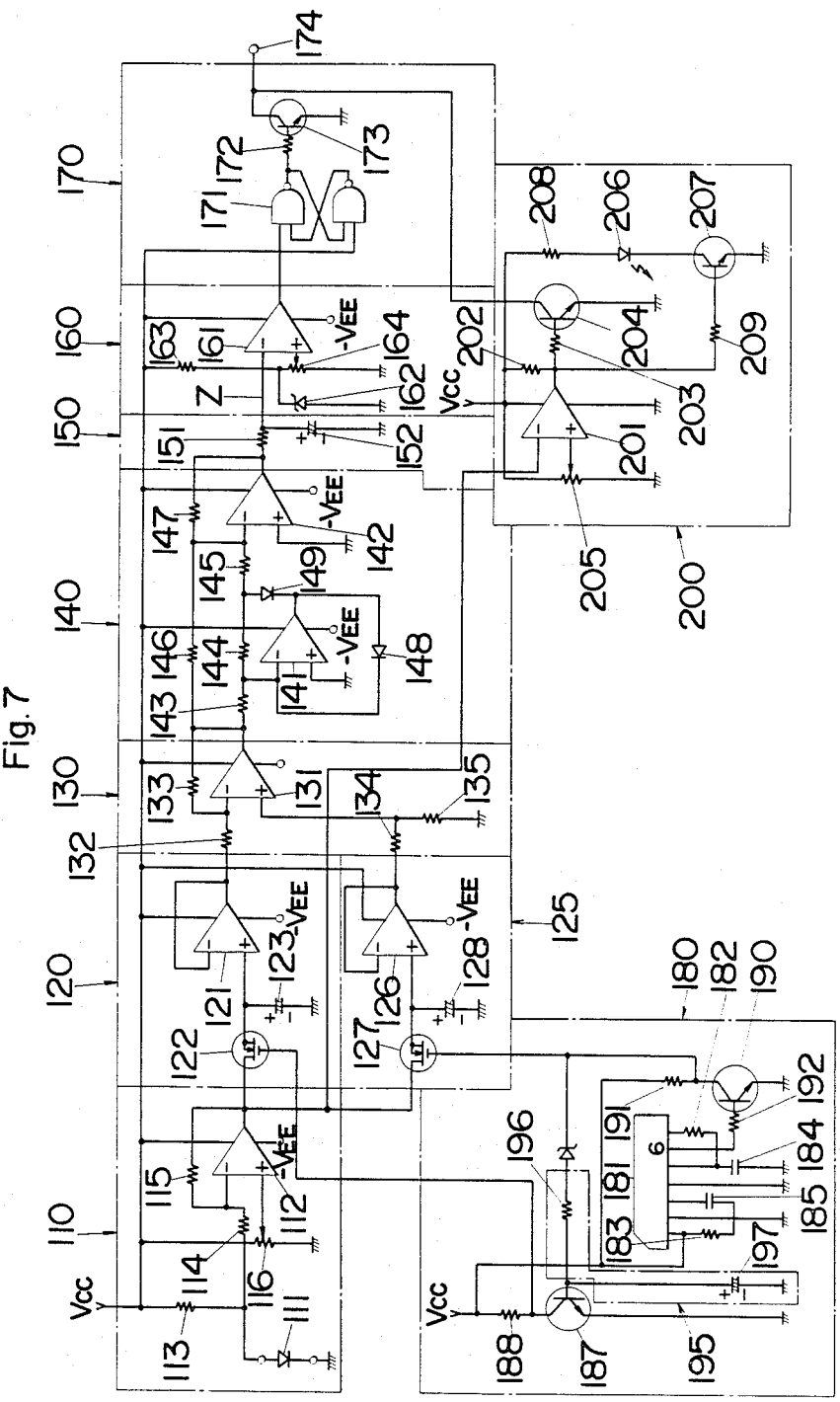
FIG. 7 is a detailed circuit diagram of the circuit of FIG. 6.
Figure 8:
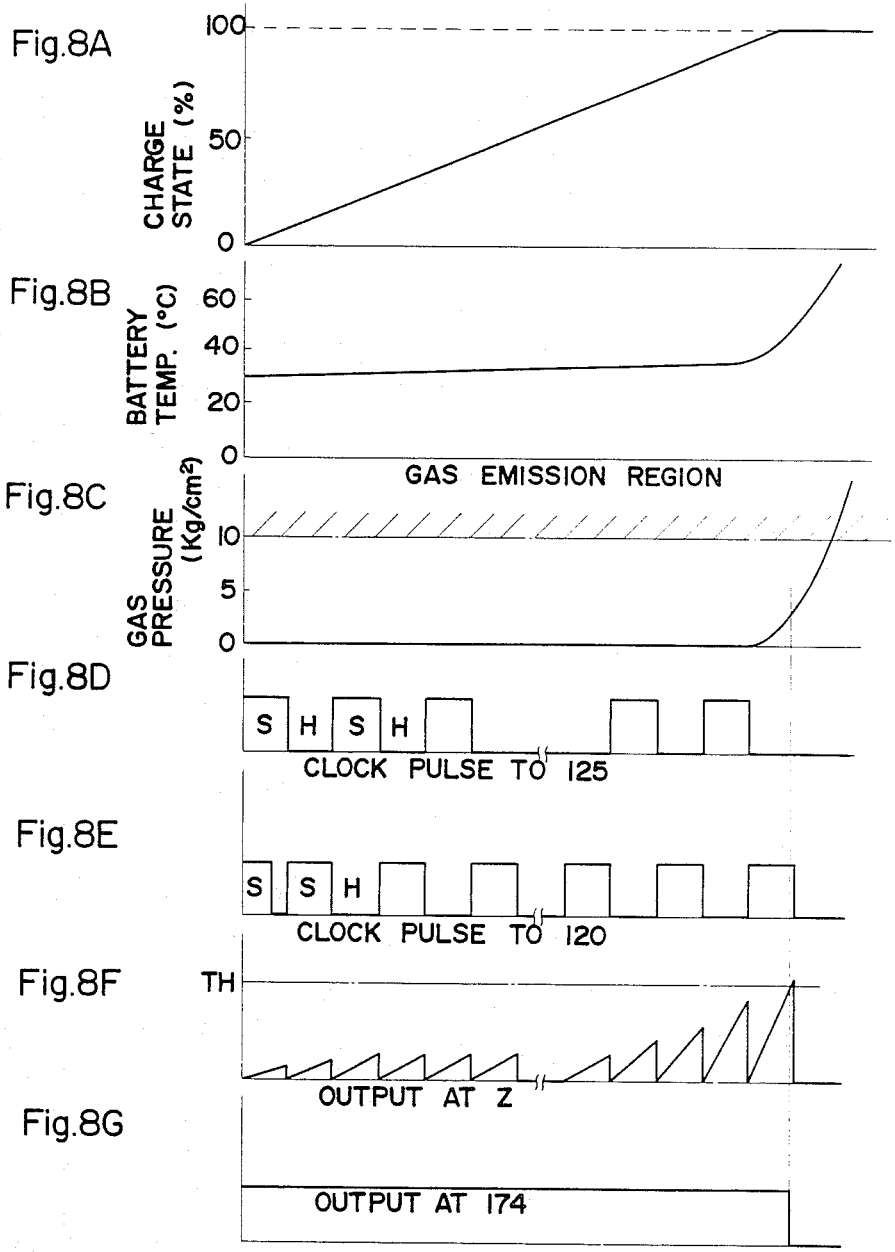
FIG. 8, composed of FIGS. 8A to 8G, is a time chart showing the waveforms of output signals at particular points in the control circuit of FIG. 6 together with terminal characteristics of the battery being charged.

A control circuit in accordance with a second embodiment of the present invention is shown in FIGS. 6 and 7 in which a pair of first and second sample-and-hold circuits 120 and 125 are cooperative with a differential circuit 130 to obtain the time derivative [dT/dt] of the battery temperature being sensed. The control circuit includes a sensor circuit 110 composed of diode 111, operational amplifier 112, resistors 113 to 115, variable resistor 116 for constantly sensing the battery temperature and providing an output voltage indicative thereof. First and second sample-and-hold circuits 120 and 125, each repeating at a clock frequency to measure the output level of sensor circuit 110 and to hold the last measured value thereof in the same fashion as in the first embodiment, are respectively composed of operational amplifiers 121 and 126, transistors 122 and 127, and capacitors 123 and 128. A clock 180 provides a clock pulse to the gate electrode of transistor 122, 127 of each sample-and-hold circuit 120,125 in order to alternately drive first and second sample-and-hold circuits 120 and 125 in such a way that one of the sample-and-hold circuits is in sampling operation while the other is in holding operation. Differential circuit 130, composed of differential amplifier 131 and resistors 132 to 135, has its inputs connected respectively to first and second sample-and-hold circuits 120 and 125 to obtain the electric signal indicative of the difference thereof per unit time, or the time derivative of the battery temperature being sensed. Since the electric signal thus obtained is of reversing polarity, it is fed to an absolute value circuit 140 to be thereby converted into a corresponding absolute value for ensuring valid comparison to be subsequently made. Absolute value circuit 140, which is composed of a pair of operational amplifiers 141 and 142, resistors 143 to 147, and diodes 148 and 149, is connected to an integrator 150 composed of resistor 151 and capacitor 152 for obtaining an integrated electrical value from the output of absolute value circuit 140, ensuring effective comparison at a judging circuit 160 with a predetermined threshold. Judging circuit 160 comprises a comparator 161 which has its inputs connected respectively to integrator 150 and a threshold voltage generator composed of zener diode 162, resistor 163, and variable resistor 164 to define the threshold. Connected to judging circuit 160 is an output circuit 170 which comprises a NAND latch 171, resistor 172, and output transistor 173 with an open-collector output terminal 174. When the integrated electrical value from integrator 150 remains less than the threshold, comparator 161 of judging circuit 160 provides the first control signal at output terminal 174, actuating the switching means 5 of battery charger 1 to charge the battery 2 at the high rate charge. When the integrated value goes beyond the threshold, comparator 161 responds to produce the second control signal at output terminal 174, changing over switching means 5 to terminate the high rate charge, in the same manner as in the first embodiment. The above operation of the control circuit can be easily understood with reference to FIG. 8, which is similar to FIG. 5 and composed of FIGS. 8A to 8F respectively showing, with respect to charge time, charge state [%] of battery (FIG. 8A), surface temperature [°C] of battery (FIG. 8B), the internal gas pressure [Kg/cm$^2$] of battery (FIG. 8C), waveform of the clock pulse fed to second sample-and-hold circuit 125 (FIG. 8D), waveform of the clock pulse fed to first sample-and-hold circuit 120 (FIG. 8E), waveform of the output signal at point Z in FIGS. 6 and 7 (FIG. 8F), and waveform of the output at output terminal 174 (FIG. 8G).

Clock 180 comprises timer IC 181, external resistors 182 and 183, capacitors 184 and 185 for providing at its pin 6 a clock pulse of a suitable frequency determined thereby. Also included in clock 180 are a combination of first control transistor 187 and resistor 188 for switching the transistor 122 of first sample-and-hold circuit 120, and another combination of second control transistor 190, resistors 191 and 192 for switching the transistor 127 of second sample-and-hold circuit 125. It is noted at this time that since first and second sample-and-hold circuits 120 and 125 are arranged in a pair so as to obtain the difference between the output levels thereof as indicating the time derivative [dT/dt] or temperature gradient of the battery temperature being sensed, the signal at the output of integrator 150 can be obtained in an uninterrupted manner as shown in FIG. 8F, which is in contrast to FIG. 5E of the first embodiment. With this result, the output signal of integrator 150 can faithfully and uninterruptedly monitor the increase of the battery temperature, never missing the abrupt increase in the battery temperature indicative of the full charge being reached and therefore contributing to increased reliability of the control circuit.

Another important feature envisaged in the present invention is to provide a reset circuit 195 which is cooperative with clock 180 for preventing differential amplifier 131 from obtaining a false signal from the outputs of sample-and-hold circuits 120 and 125 at the time of energizing the control circuit. By "false signal" herein is meant a signal indicative of the time derivative of the battery temperature exceeding the threshold in the absence of true abrupt rise in the battery temperature which can be seen in the battery reaching its full charge state. Such false signal might results from the condition in which offset values possibly remaining in sample-and-hold circuits 120 and 125 due to the deenergization thereof have a relatively larger difference and those values are added respectively to the values measured by sample-and-hold circuits 120 and 125 while maintaining the difference at the subsequent energization of the control circuit. Once this occurs, comparator 161 of judging circuit 160 is misled by such false signal, or the false difference to provide the second control signal, unnecessarily terminating the high rate charging. This can be successfully avoided by incorporating the reset circuit 195 in the form of a delay circuit composed of resistor 196 and capacitor 197 inserted between in the collector output of control transistor 190 for second sample-and-hold circuit 125 and the base input of control transistor 187 for first sample-and-hold circuit 120. Resistor 196 is inserted between the collector of control transistor 190 and the base of control transistor 187, while capacitor 197 is inserted in the base-emitter path of control transistor 187. Thus, when timer IC 181 provides initially at its pin 6 a low level signal upon energization of the control circuit, control transistor 190 is rendered nonconductive to thereby trigger transistor 127 for causing second sample-and-hold circuit 125 to enter its sampling operation, at which occurrence the delay circuit acts to delay the conduction of control transistor 187 and therefore trigger transistor 122 until capacitor 197 is fully charged up, thus causing first sample-and-hold circuit 120 to enter its sampling operation for only a limited time period within the half cycle of the clock pulse or before the low level signal at pin 6 is changed over to a high level signal. After the elapse of the limited time period but within the half cycle of the clock pulse, control transistor 187 is rendered conductive to thereby turn off the transistor 122, causing first sample-and-hold circuit 120 to change into its holding operation while the second sample-and-hold circuit 125 is kept in its sampling operation. Once the initialization or reset of sample-and-hold circuits 120 and 125 is completed, they enter into the normal operation of alternating the sampling and holding with respect to each other, as best shown in FIGS. 8D and 8E. It is within this limited time period that both first and second sample-and-hold circuits 120 and 125 are simultaneously set into sampling operations to cancel any offset value remaining therein as a consequence of the previous deenergization of the circuit, preventing the false signal or measurement from appearing and therefore assuring a consistent and faithful signal to be fed to the judging circuit 160 for increasing the reliability of the control circuit.

Figure 9:
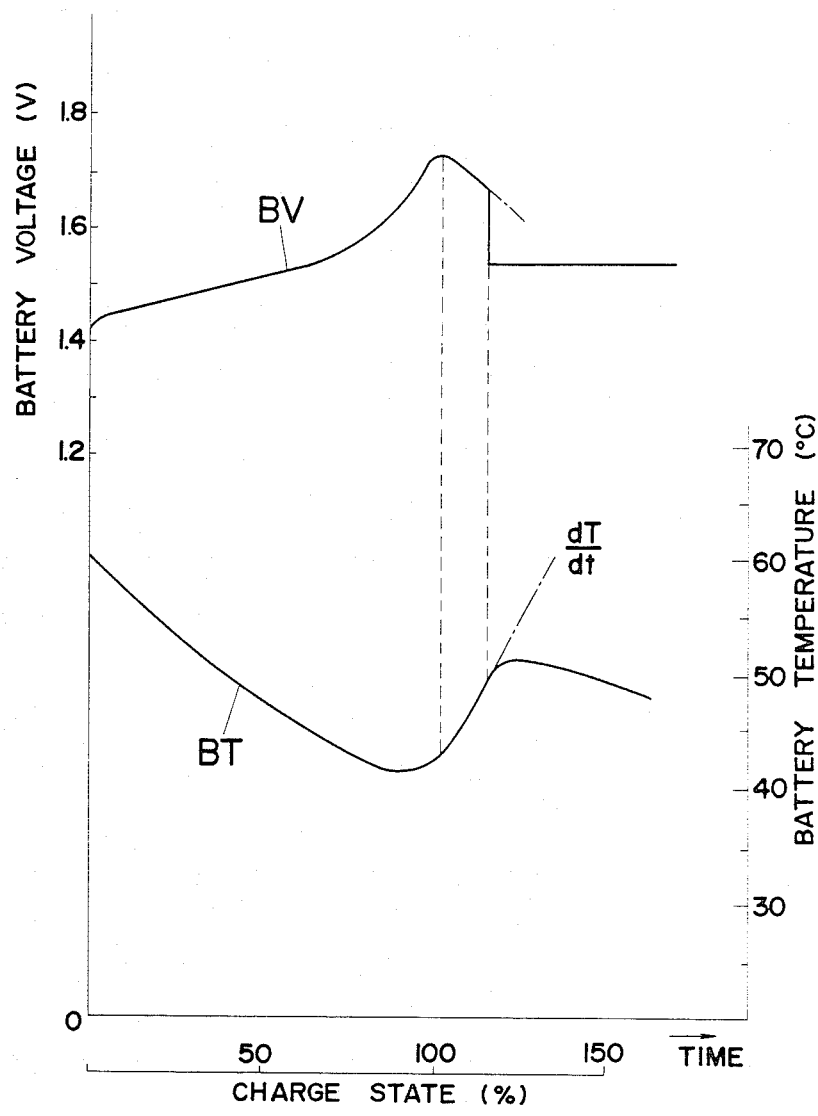
FIG. 9 is a graph illustrating a characteristic temperature curve of the battery observed when the hot battery is being charged as well as the terminal voltage of the battery.

Included in the control circuit of the present embodiment is a battery protection circuit 200 which monitors the absolute battery temperature and disables the first control signal from appearing on output terminal 174 when the battery intended to be charged is kept at a dangerously high temperature beyond which charging at the high rate may damage the battery. Protection circuit 200 comprises comparator 201, resistors 202 and 203, transistor 204, and variable resistor 205 providing a reference voltage indicative of a dangerous battery temperature beyond which the charging at the high rate is to be inhibited. At comparator 201 the output level of the sensor circuit 110 is compared with the reference voltage so as to produce a high level signal when the former exceeds the latter otherwise produce a low level signal. The high level signal, thus indicative of the battery temperature being abnormally high, triggers the transistor 204 into conduction and provides inhibition signal which causes output transistor 173 to act as if it provides at its open-collector end or output terminal 174 the second control signal terminating the high rate charge, even when comparator 161 of judging circuit 160 responds to provide the first control signal causing the high rate charge. With the inclusion of protective circuit 200, a hot battery immediately after being discharged can be prevented from being charged at the high rate until the battery is cooled to be safe enough for receiving high charge current. Otherwise, the hot battery in which the separator is kept at a correspondingly high temperature would be soon filled up and exhibit further temperature increase upon receiving the high charge current, possibly destroying the separator or the battery. When the battery temperature is cooled enough, protection circuit 200 no longer provides the inhibition signal to output circuit 170, causing the control circuit to automatically initiate and continue the high rate charge until it sees an abrupt temperature increase indicative of the battery reaching its fully charged state. This process of charging the hot battery is illustrated in FIG. 9 which shows a battery temperature curve BT together with a terminal voltage of the battery BV and in which termination of the high rate charge occurs between points A and B on the battery temperature curve BT.

Additionally included in protection circuit 200 are light emitting diode (LED) 206, driving transistor 207 thereof and associated resistors 208 and 209. When the high level signal is produced at comparator 201, it triggers transistor 207 into conduction to thereby turn on LED 206 for visual indication confirming the user of the fact that the battery intended to be charged is too hot to be charged and that the control circuit has not failed but is only delaying the charging until the battery is cooled to an acceptable level.

Third embodiment [FIG. 10]

A control circuit in accordance with a third embodiment of the present invention utilizes a temperature compensative battery protection circuit 220 instead of battery protection circuit 200 in the second embodiment. The other circuit configuration and operation are identical to those of the second embodiment and therefore same parts are designated by same numerals. The battery protection circuit 220 of the present embodiment contemplates to provide a safeguard against the battery damage should the battery exhibit an abnormal temperature increase without accompanying the abrupt temperature rise indicative of the full charge state such that the control circuit cannot detect the full charge state. If this abnormal temperature increase is present, the battery would be forced to be continuously charged at the high rate far beyond the full charge state and consequently be damaged. The above protection circuit 220 detects the presence of such abnormal temperature increase by monitoring the difference between the battery and ambient temperatures in order to produce an inhibition signal terminating the first rate charge when the difference goes beyond a predetermined reference value as indicative of the abnormal temperature increase. For this purpose the protection circuit 210 includes a sensing circuit 220 for sensing the ambient temperature of the control circuit, which sensing circuit 220 has diode 221, operational amplifier 222, resistors 223 to 225, variable resistor 226, arranged in the same configuration in the battery sensor circuit 110, to provide an output voltage indicative of the ambient temperature plus a critical value defining an allowable battery-to-ambient temperature difference range outside of which the high rate charge is to be inhibited. The resulting output of ambient temperature sensor circuit 210 and the output of battery temperature sensor circuit 110 are fed respectively to a comparator 230 which responds to produce the inhibition signal when the temperature difference is judged to be greater than the predetermined critical value. Also included in the protection circuit 210 is a combination of transistor 234 and resistors 232 and 233. Transistor 234 is triggered by the inhibition signal into conduction which in turn actuates output transistor 173, disabling the first control signal to appear at output terminal 174 and only allowing the second control signal to appear thereat for terminating the high rate charge.

In the meanwhile, it is not infrequent that the battery temperature intended to be charged is at an elevated temperature far above the ambient temperature. In such condition, the natural or free cooling of the hot battery is likely to proceed at a temperature gradient of which the absolute value is so large as to actuate comparator 161 to provide the second control signal and consequently hold the output circuit 170 in latched condition not permitting the first control signal to be produced thereafter. When such a hot battery is intended to be charged, the control circuit acts in a fail-safe manner to inhibit proceeding with the high rate charge. However, before the control circuit responds to terminate the high rate charge there might be a certain time period during which the high rate charge takes place. This high rate charge for even a short time is very dangerous to the battery since only a small amount of the high charge current will be enough to damage the battery when it is kept at an extremely high temperature level. In this connection, the above protection circuit 220 is also useful in that it responds to such greater temperature difference for immediately terminating the high rate charge for reliable battery protection.

It should be noted at this point that the inhibition signal from comparator 230 may be utilized to be fed to a point between NAND latch 171 of output circuit 170 and comparator 161 of judging circuit 160 in such a manner as to render NAND latch 171 inoperaive only while the battery temperature is critically high relative to the ambient temperature. With this scheme, NAND latch 171 never acts when the natural cooling of the hot battery is proceeding at a greater temperature gradient than necessary to provide the output indicative of the false full charge state but will certainly acts when the battery is actually charged to its full capacity, thus enabling automatic operational sequence of the control circuit starting from disabling the high rate charge when there is critical temperature difference, initiating the high rate charge after the difference becomes less critical, and terminating the high rate charge in response to the battery actually reaching its full charge state.

What is claimed is:

1. A charge control circuit for a battery charger to selectively provide first and second control signals, the first control signal actuating the battery charger to operate at a first charge rate and the second control signal actuating it to operate at a second charge rate, said charge control circuit comprising;
   sensor means for sensing temperature of the battery being charged and providing an output indicative thereof;
   a pair of sample-and-hold circuits each periodically operating to measure a value of the output of said sensor means and to hold the last measured value;
   said sample-and-hold circuits operating alternately with respect to time so that one circuit is in a sampling operation while the other is in a holding operation;
   a differential amplifier which subtracts the output of one of the sample-and-hold circuits from the output of the other circuit so as to obtain the difference between the instantaneous value being measured by the one circuit and the last value measured by the other circuit whereby differentiating the output of the sensor means with respect to time and providing uninterruptedly an instantaneous time derivative thereof indicative of a corresponding gradient of the battery temperature being sensed; and
   judging means for comparing the time derivative with a predetermined threshold in order provide said first control signal when the time derivative is below the threshold and provide said second control signal when the time derivative exceeds the threshold.

2. A charge control circuit as set forth in claim 1, further including battery protection circuit means which compares the output level of said sensor means with a predetermined reference level indicative of a dangerous battery temperature beyond which charging at the first charge rate will damage the battery, so as to provide an inhibition signal when the output level of the sensor means indicative of the battery temperature exceeds the reference level, said inhibition signal disabling the first control signal to be fed to the charging circuit until the output level of the sensor means is decreased to a level below said predetermined reference level.

3. A charge control circuit as set forth in claim 2, wherein said protective circuit means includes an indicator lamp which is lit up in response to the inhibition signal being issued.

4. A charge control circuit as set forth in claim 1, further including temperature compensative battery protection circuit means with an ambient temperature sensor means for sensing the ambient temperature of the control circuit and providing an output indicative thereof, said protection circuit means obtaining the difference between the output levels of the battery temperature sensor means and the ambient temperature sensor means so as to provide an inhibition signal when the difference is greater than a predetermined reference value, said inhibition signal disabling said first control signal to be fed to the battery charger until the difference is reduced to within said predetermined reference value.

5. A charge control circuit as set forth in claim 1, further including a reset circuit which operates response to energization of the sample-and-hold circuits for momentarily actuating them into simultaneous sampling operations prior to the circuits being driven to operate alternately with the sampling and holding operations of one circuit staggered with those of the other circuit with respect to time.

* * * * *